United States Patent
Singh et al.

(10) Patent No.: US 8,673,493 B2
(45) Date of Patent: Mar. 18, 2014

(54) INDIUM-TIN BINARY ANODES FOR RECHARGEABLE MAGNESIUM-ION BATTERIES

(75) Inventors: Nikhilendra Singh, Ypsilanti, MI (US); Masaki Matsui, Mie (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 40 days.

(21) Appl. No.: 13/482,643

(22) Filed: May 29, 2012

(65) Prior Publication Data

US 2013/0323582 A1 Dec. 5, 2013

(51) Int. Cl.
*H01M 4/38* (2006.01)
*H01M 10/40* (2006.01)

(52) U.S. Cl.
USPC .................. 429/218.1; 429/178; 429/188

(58) Field of Classification Search
None
See application file for complete search history.

(56) References Cited

U.S. PATENT DOCUMENTS

| | | | |
|---|---|---|---|
| 2,683,184 A | 7/1954 | Boswell | |
| 2,934,583 A | 4/1960 | Stevens | |
| 5,039,576 A | 8/1991 | Wilson | |
| 5,510,046 A | 4/1996 | Li et al. | |
| 6,316,141 B1 | 11/2001 | Aurbach et al. | |
| 6,864,522 B2 | 3/2005 | Krieger et al. | |
| 6,955,866 B2 | 10/2005 | Nimon et al. | |
| 7,488,526 B2 | 2/2009 | Hayashi et al. | |
| 7,871,727 B2 | 1/2011 | Obrovac et al. | |
| 2001/0053480 A1 | 12/2001 | Koga et al. | |
| 2003/0064292 A1 | 4/2003 | Neudecker et al. | |
| 2005/0069776 A1 | 3/2005 | Holl et al. | |
| 2005/0271796 A1 | 12/2005 | Neudecker et al. | |
| 2006/0024582 A1 | 2/2006 | Li et al. | |
| 2006/0222955 A1 | 10/2006 | Ogawa et al. | |
| 2007/0172737 A1 | 7/2007 | Oki et al. | |
| 2008/0182176 A1 | 7/2008 | Aurbach et al. | |
| 2009/0264295 A1 | 10/2009 | Nardelli et al. | |
| 2009/0311608 A1 | 12/2009 | Hirose et al. | |
| 2010/0124706 A1 | 5/2010 | Hirose et al. | |
| 2010/0136438 A1 | 6/2010 | Nakayama et al. | |
| 2010/0310933 A1 | 12/2010 | Jiang et al. | |
| 2011/0081576 A1 | 4/2011 | Chung et al. | |
| 2011/0214895 A1 | 9/2011 | Ihara et al. | |
| 2011/0250509 A1 | 10/2011 | Yamaguchi et al. | |
| 2011/0284825 A1* | 11/2011 | Yang et al. | 257/40 |

FOREIGN PATENT DOCUMENTS

WO WO-2009008232 A1 1/2009
WO WO-2011132065 A1 10/2011

* cited by examiner

*Primary Examiner* — John S Maples
(74) *Attorney, Agent, or Firm* — Gifford, Krass, Sprinkle, Anderson & Citkowski, P.C.

(57) ABSTRACT

A rechargeable magnesium-ion battery includes a first electrode, a second electrode, and an electrolyte layer between the first electrode and the second electrode. The electrolyte includes a source of magnesium ions, such as a magnesium salt. The first electrode includes an active material, the active material including indium and tin, for example as a solid solution or intermetallic compound of indium and tin.

16 Claims, 4 Drawing Sheets

INDIUM-TIN BINARY ANODES FOR RECHARGEABLE MAGNESIUM-ION BATTERIES

FIELD OF THE INVENTION

The invention relates to rechargeable magnesium-ion batteries.

BACKGROUND OF THE INVENTION

Lithium-ion batteries have found widespread applications. However, improved batteries with higher volumetric energy-densities may allow further use of batteries in various applications, including automobiles.

SUMMARY OF THE INVENTION

Examples of the present invention include a magnesium-ion ($Mg^{2+}$) rechargeable (secondary) battery having a first electrode and a second electrode. In some examples, the first electrode has an active material that includes both indium (In) and tin (Sn), for example as an In—Sn binary active material, such as an indium-tin (In—Sn) intermetallic compound. The first electrode may be an anode, or negative electrode for battery discharge. Examples of the present invention include a high capacity In—Sn binary anode material with improved Mg-ion insertion/extraction voltages, for use in rechargeable magnesium-ion batteries, the binary anode material acting as a magnesium-ion (Mg-ion, or $Mg^{2+}$) host material.

An example magnesium-ion battery includes an anode support, an anode, an electrolyte layer, a cathode, and a cathode support. The anode and the cathode supports may comprise a metal, and may be part of a battery housing and allow external electrical contact to the battery. In some examples, the anode and cathode supports may also be the battery terminals. The anode may be fabricated using In and Sn, for example using sputtering or any other appropriate deposition process. In some examples, the anode active material may be formed directly on the battery anode terminal, the outside surface of the terminal providing an electrical contact for the battery, and the inner surface of the terminal acting as the anode support on which the active material is deposited.

Examples of the present invention include a high energy-density In—Sn anode active material combining the low $Mg^{2+}$ insertion/extraction voltage of indium (In) and the excellent capacity of tin (Sn), for use in rechargeable magnesium-ion batteries, the binary anode active material acting as an $Mg^{2+}$ host material. In some examples, the active material includes a metallic combination of indium and tin when the active material is in a charged state, and includes an indium-magnesium compound, a tin-magnesium compound and a indium-tin-magnesium intermetallic compound when the active material is in a discharged state.

An example anode includes In—Sn binary alloys, for example as a solid solution of one in the other. An anode may include clumps or regions of In and/or Sn, for example an anode including a mixture of In and Sn nanoparticles, for example an In—Sn binary mixture. In some examples, the anode active material includes an In—Sn intermetallic compound, for example of the form $In_{1-x}Sn_x$. In some examples, an intermetallic compound may not be exactly stoichiometric or have long range crystalline properties, but may approximate such a material.

An example battery has an electrolyte layer between the first and second electrodes, i.e. between the anode and cathode. The electrolyte layer may include a source of magnesium ions ($Mg^{2+}$), such as a magnesium compound, in particular a magnesium salt. The magnesium compound may be dissolved in a non-aqueous solvent, such as an organic solvent, for example tetrahydrofuran (THF). The counter ion may be trifluoromethanesulfonimide (TSFT), perchlorate ($ClO_4^-$), hexafluorophosphate ($PF_6^-$), or other counter ion, preferably being a counter ion having high oxidation stability. In other examples, the electrolyte includes magnesium ions within an ionic liquid, for example as a solution of an ionic magnesium compound in an ionic liquid (or molten salt).

In some examples, the electrolyte layer may include a separator, such as a polymer separator, to prevent physical and electrical contact between the anode and cathode. In some examples the electrolyte layer may include a polymer ion-conductive layer, conductive to magnesium ions.

Examples of the present invention include indium (In)-tin (Sn) binary anodes capable of undergoing insertion/extraction of $Mg^{2+}$, via the formation of fully magnesiated In—Sn phases during the discharge cycle. Improved anode active materials combine the low insertion/extraction voltages observed with In anodes and the high capacity observed with Sn anodes into an improved anode active material. Example anodes include a binary anode material, including In and Sn as active materials, with low $Mg^{2+}$ insertion/extraction voltages and high capacity, for use in rechargeable magnesium-ion batteries. The binary anode material acts as an $Mg^{2+}$ host material. In some examples, the anode active material is an In—Sn intermetallic compound.

A method of preparing a magnesium-ion battery includes co-depositing In and Sn on an electrode support so as to form an anode active material that includes both In and Sn, such as a binary combination of In and Sn. The anode may include an intermetallic film of In—Sn, for example having the composition $In_{1-x}Sn_x$, where $0<x<1$. Further, the film may be used as an anode assembly of an improved magnesium-ion battery, including an electrolyte and a cathode so as to form the magnesium-ion battery.

A method of operation of a rechargeable magnesium-ion battery includes providing a battery including a first electrode having an active material, a second electrode, and an electrolyte located between the first electrode and the second electrode, the electrolyte including a source of magnesium ions such as a magnesium salt. The active material includes indium and tin. During operation of the rechargeable battery, the active material allows insertion and extraction of the magnesium ions, where insertion of the magnesium ions include formation of a fully magnesiated indium compound and a fully magnesiated tin compound. The anode active material may include a binary mixture of indium and tin, such as a binary solid solution and/or a binary intermetallic compound having long-range crystalline order.

The formation of binary In—Sn anode active materials allows anodes to possess the high capacity and low polarization of Sn, and also the low $Mg^{2+}$ insertion/extraction voltages of In. This approach is a novel way to combine the advantages of two individual anode materials, in this case In and Sn, into an anode active material including both In and Sn.

An improved method of operating a magnesium-ion battery includes providing an anode including In and Sn, an electrolyte including magnesium ions, and a cathode, and obtaining electrical energy by storing magnesium ions in the anode. Magnesium-ion storage may include formation of magnesiated compounds of In and Sn, in some examples fully magnesiated compounds of either or both metals.

DETAILED DESCRIPTION OF THE INVENTION

Figure 1:
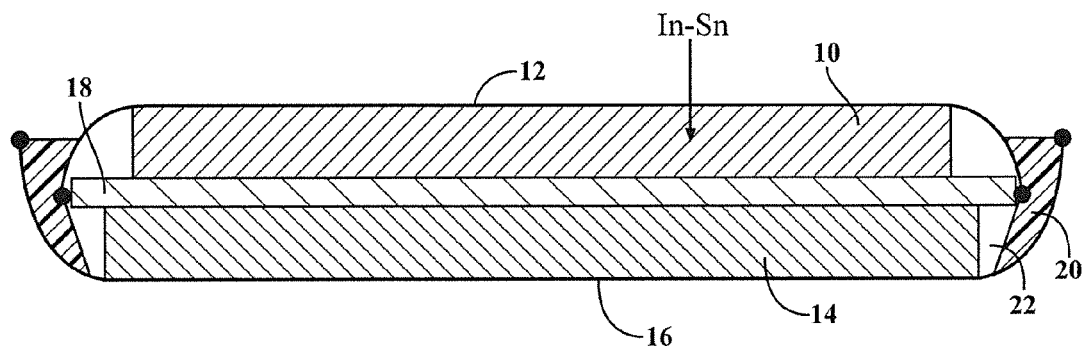
FIG. 1 shows an example magnesium-ion battery.

Examples of the present invention include a magnesium-ion (Mg-ion) battery having an electrode including a binary mixture of indium (In) and tin (Sn). For example, an electrode may include In and Sn in a binary combination, such as an intermetallic compound, for example an intermetallic compound having the composition $In_{1-x}Sn_x$, where $0<x<1$. In some examples, the anode active material includes both regions of In and regions of Sn, in some cases along with one or more intermetallic In—Sn compounds. The In:Sn atomic ratio in a binary combination may be in the range In:Sn 1:99 to 99:1, such as 10:90 to 90:10, the atomic ratio and hence composition of the electrode active material being chosen in view of the desired balance between the higher capacity of Sn and the lower $Mg^{2+}$ insertion voltage of In.

An electrode of an improved magnesium-ion battery includes two materials that individually act as electrode active materials. The combination allows for a single electrode, such as an anode, to provide the advantages associated with each individual constituent species. An electrode active material including In and Sn, for example as a binary alloy and/or intermetallic compound, allows battery capacity and $Mg^{2+}$ insertion/extraction voltage to be traded off in a controlled manner. This gives considerable advantages over conventional batteries in which a single species of electrode active material is used.

Rechargeable Mg-ion batteries show promise as high energy battery systems, due to the high capacity density available via a two electron transfer per Mg ion. Mg metal anodes display 3833 Ah/L of theoretical capacity density while Li metal anodes only display 2061 Ah/L. The development of high voltage and high capacity Mg-based batteries poses a significant challenge for the development of electrodes and electrolytes, alike. Tetrahydrofuran (THF) based organohaluminates have been used as electrolytes, since high oxidation stability ionic electrolytes are not feasible with Mg metal anodes, due to the formation of a $Mg^{2+}$ blocking layer on the Mg metal surface.

Using a Mg-ion insertion anode, instead of a Mg metal anode, allows the use of high oxidation stability electrolytes such as magnesium salts of $TSFI^-$ ($Mg(TFSI)_2$, magnesium bistrifluoromethanesulfonimide), $ClO_4^-$, and $PF_6^-$. Mg-ion insertion anodes allow a larger cell voltage to be achieved.

In U.S. Pat. No. 6,316,141, Aurbach et al. reported a rechargeable Mg battery using $Mo_3S_4$ as a cathode. This cathode showed good cyclability, but apparently only showed 77 $mAhg^{-1}$ (approx. 310 AWL) capacity, when theoretically it should display 122 $mAhg^{-1}$ (approx. 490 Ah/L). Examples of the present invention may use a $Mo_3S_4$ cathode, or other ion-insertion cathode such as another Mg-ion intercalating Chevrel-phase material, and achieve much improved operating voltages (via the use on conventional battery electrolytes) through the use of a Mg-ion insertion anode in place of the Mg metal anode.

When used individually as an anode active material for a magnesium-ion battery, In has a lower ion insertion voltage for $Mg^{2+}$ (compared with Sn), and Sn provides a much higher capacity (903 mAh/g) than In (700 mAh/g). However, by combining In and Sn in an anode active material for the first time, the lower $Mg^{2+}$ insertion voltage of In and the higher capacity of Sn may be combined in a single anode. The relative proportions of In and Sn may be adjusted to obtain the desired balance of $Mg^{2+}$ insertion/extraction voltages and capacity.

Examples of the present invention include an anode active material formed by combining two individual anode active materials to form a binary or intermetallic anode active material. This presents two types of $Mg^{2+}$ insertion/extraction based intermetallic anode materials capable of being used with conventional ionic electrolytes for a rechargeable Mg-ion battery system. An improved magnesium-ion battery has an indium-tin (In—Sn) anode, capable of undergoing insertion/extraction of $Mg^{2+}$.

Examples of the invention include a Mg-ion battery having an indium (In)—tin (Sn) binary anode capable of undergoing insertion/extraction of $Mg^{2+}$, via the formation of fully magnesiated In and Sn phases during the discharge cycle. The anode active material combines the lower $Mg^{2+}$ insertion/extraction voltage observed with In anodes and the high capacity observed with Sn anodes into one material.

FIG. 1 shows an example battery, in this example having a single cell, including an In—Sn anode 10, anode terminal 12, cathode 14, cathode terminal 16, electrolyte layer 18 (including a separator and electrolyte), insulating seal around the edge at 20, and insulating region 22. In this specification, the term 'battery' includes both single cell and multiple cell configurations.

As shown in FIG. 1, the anode terminal 12 and cathode terminal 16 provide both battery terminals, effectively part of the battery housing enclosing the electrochemical compounds, and also act as the anode and cathode supports respectively. The insulating seal 20 is formed between the anode terminal and cathode terminal, sealing the battery. The separator is not shown for clarity in the illustrated battery, and may be omitted if not required.

The physical form of the battery is not limited by the illustrated example, and the battery may be a disc, block, or other physical form. A battery, as used here, includes the single-cell configuration of FIG. 1, and also multiple-cell batteries in which individual cells may be in parallel, and/or in series, electrically.

The In—Sn anode may be deposited by any appropriate method, such as sputtering (such as RF magnetron sputtering), or solution-based deposition techniques such as electrodeposition, or formation and deposition of powder films, for example using In and Sn powders. A binary anode may be formed using In and Sn nanoparticles. In some examples, powder films may include In and/or Sn containing precursors, and are converted into the metallic form by a suitable process such as heating.

Here, the terms "In—Sn" refers to an active electrode material including both In and Sn, which may include one or more intermetallic compounds or solid solution, such as an alloy. In some examples, the active material of an In—Sn electrode includes a binary intermetallic compound of In and Sn, for example one having the composition $In_{1-x}Sn_x$, where $0<x<1$. For example, x may be in the range of 0.05 to 0.95, in particular 0.2 to 0.8, such as 0.4 to 0.6 (inclusive).

In some examples, the anode may include nanoparticles (particles having a radius between 0.5 nanometers and 100 nanometers) of In, Sn, and/or InSn (where InSn generally represents a binary compound of unspecified composition, including but not limited to a 1:1 atomic ratio of In to Sn).

The anode film may be generally planar, and in some examples may conform to the inner surface of a battery terminal. The anode may be deposited or otherwise formed directly onto the interior surface of an anode terminal. The anode terminal may be a metal sheet that also forms a portion of the battery housing and an electrical terminal of the battery.

In some examples the anode is formed by direct deposition of the anode onto the inner surface of a battery terminal, giving advantages in both weight and power density of the battery.

Any conventional cathode material can be used, such as a material capable of storing and releasing magnesium ions having a different electrochemical voltage from the In—Sn electrode. In some examples, depending on the choice of anode, an In—Sn material as described herein may be used as an improved cathode. Other examples will be apparent to those skilled in the art.

Figure 2A:
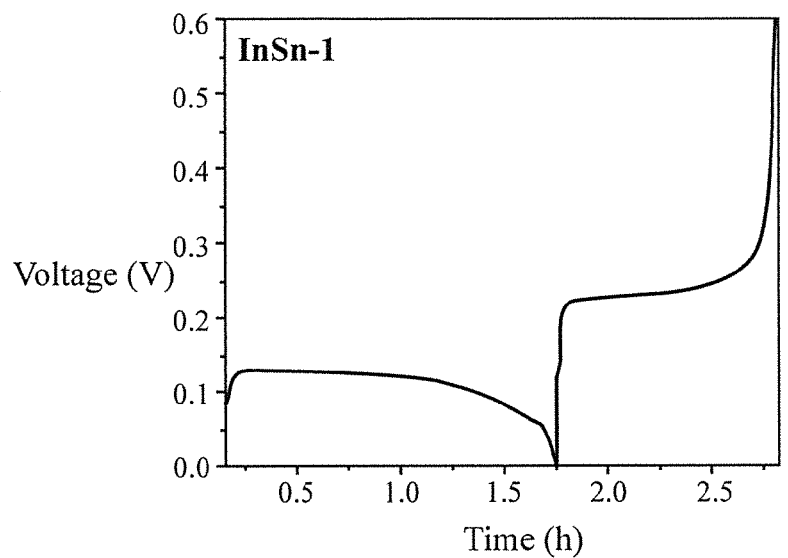
FIGS. 2A-2C illustrates the insertion and extraction of magnesium ions in In—Sn films, the figures show the first $Mg^{2+}$ insertion/extraction cycle for three as-deposited InSn films of differing compositions.
Figure 2B:
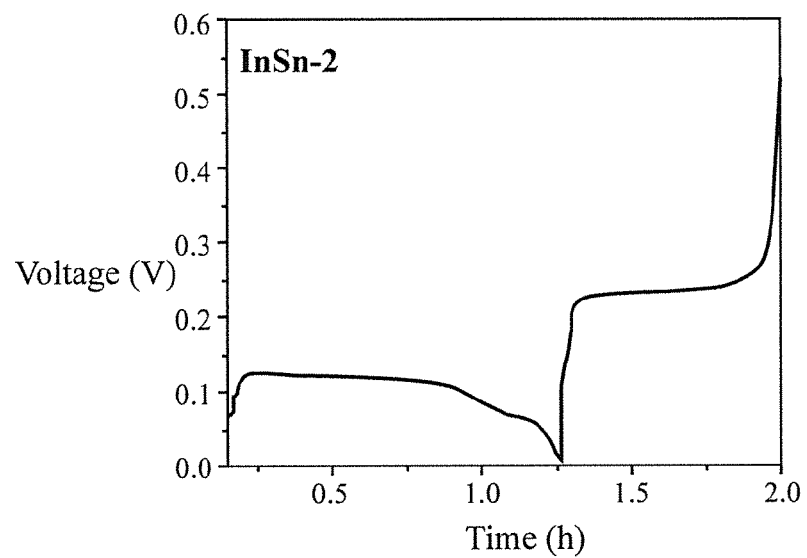
Figure 2C:
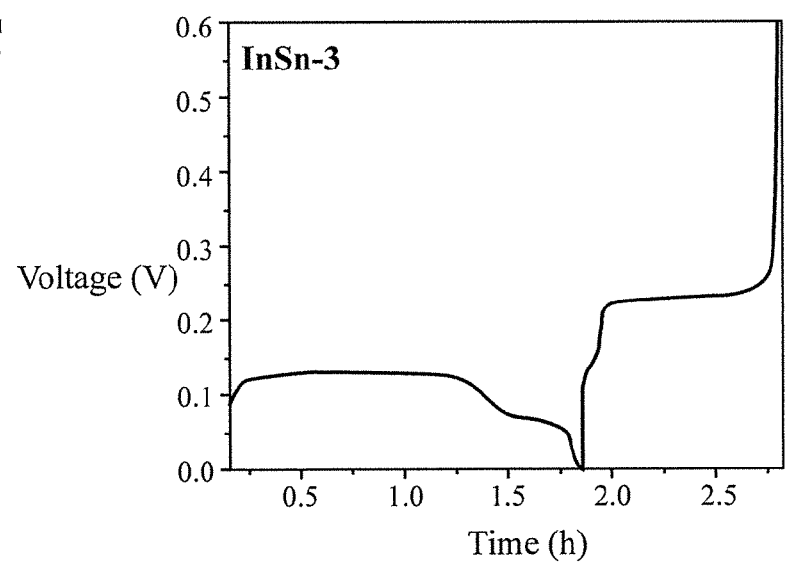

FIGS. 2A, 2B, and 2C show first $Mg^{2+}$ insertion/extraction cycles for as deposited In—Sn films, denoted InSn-1, InSn-2, and InSn-3 respectively. Film compositions are shown in Table 1 below. The figures show data for In—Sn anode half cells at a C/100 rate during the first cycle on a Cu foil substrate. As seen in the figures, all In—Sn anodes are capable of $Mg^{2+}$ insertion/extraction processes while displaying low $Mg^{2+}$ insertion/extraction voltages and low polarization. The figures show the voltage in volts, for the three In—Sn films of different In:Sn atomic ratios.

In and Sn were co-sputtered on to a copper foil (0.1 mm thick) substrate via RF magnetron sputtering. All In—Sn anodes were sputtered to a thickness of 200 nm using 10 W (InSn-1), 20 W (InSn-2) and 30 W (InSn-3) target power for In and 30 W target power for Sn, under 3 mtorr argon pressures at room temperature. Hence, the film denoted InSn-3 has a higher proportional indium content than the InSn-1 film. The variation in applied gun powers was instituted to enable the formation of various In—Sn compositions as the final sputtered material. The substrate rotation speed was kept constant at 80 RPM to enable a uniform deposition.

The compositions of the three films were determined using energy-dispersive X-ray spectroscopy (EDX), shown below in Table I. Sample N is denoted InSn—N, as shown in FIGS. 2A-2C and FIG. 3, for N=1 to 3.

TABLE 1

EDX Results for as-deposited binary films.

|  | Atomic % Sample 1 | Atomic % Sample 2 | Atomic % Sample 3 |
|---|---|---|---|
| In | 2.60 | 2.08 | 2.89 |
| Sn | 6.30 | 4.15 | 4.52 |

Figure 3:
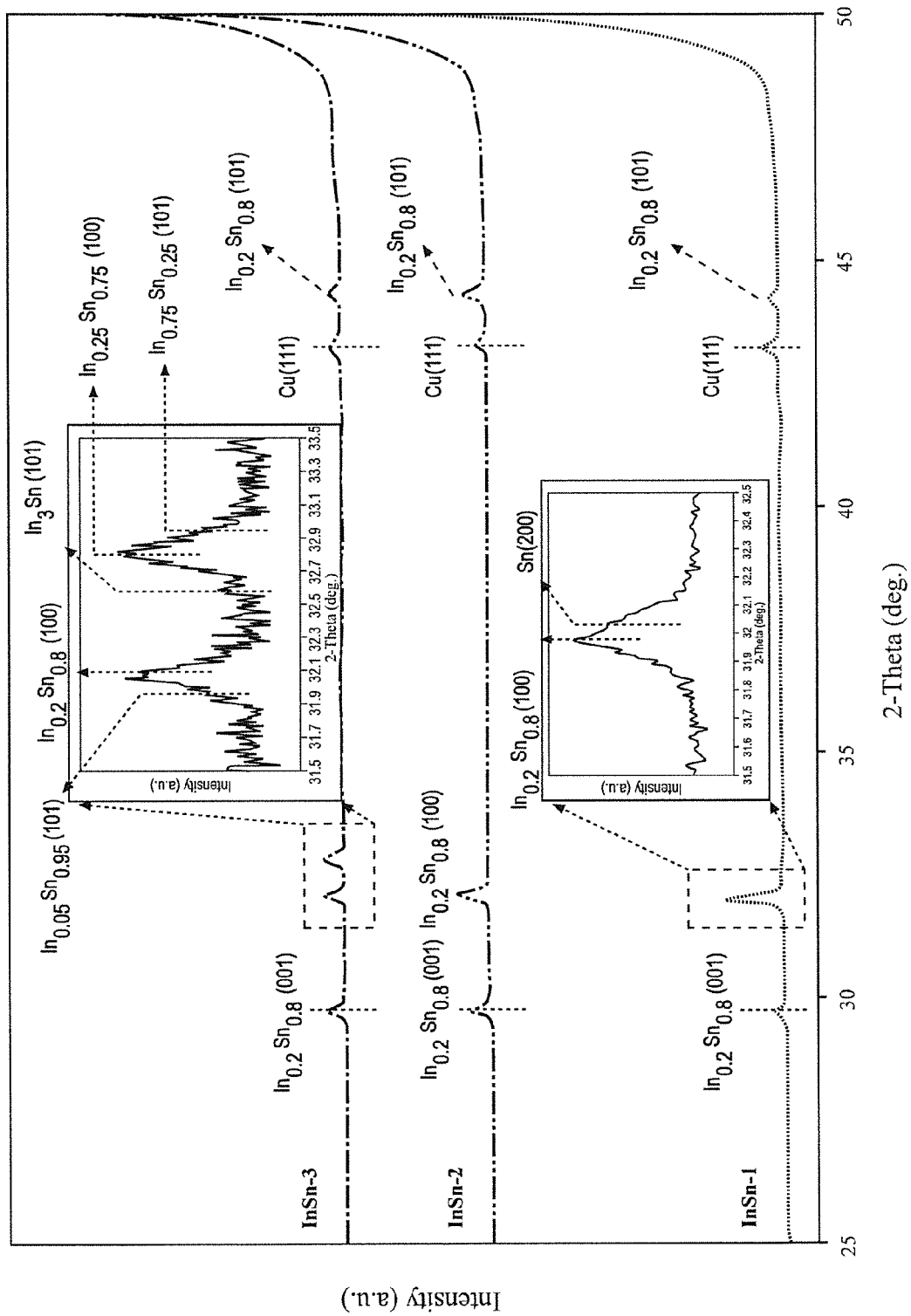
FIG. 3 shows X-ray diffraction (XRD) of as-deposited In—Sn films highlighting the formation of solid solution phases. The insets show part of the spectrum in more detail, highlighting the formation of certain phases.

FIG. 3 shows the XRD spectra collected for the as-deposited films of In—Sn. The formation of In—Sn binary anode active materials allows electrodes to be fabricated that combine the high capacity and low polarization demonstrated by Sn with the low $Mg^2$ insertion/extraction voltages of In. This approach is a novel way to combine the advantages of two individual anode materials into a binary compound used as the active material of an electrode. The formation of the In—Sn binary material allows the In—Sn anode active material to have a higher capacity than an In anode, and a lower $Mg^{2+}$ insertion/extraction voltages relative to an Sn anode.

FIG. 3 illustrates significant formation of In—Sn intermetallic phases. The insets show certain peaks in more detail. Observed binary compounds (from left to right) include $In_{0.2}Sn_{0.8}$ (001, 100, and 101) (sample 1, lower curve), $In_{0.2}Sn_{0.8}$ (001, 100, and 101) (sample 2, middle curve), and $In_{0.2}Sn_{0.8}$ (001), $In_{0.05}Sn_{0.95}$ (101), $In_{0.2}Sn_{0.8}$ (100), $In_3Sn$ (101), $In_{0.25}Sn_{0.75}$ (100), $In_{0.75}Sn_{0.25}$ (101), $In_{0.2}Sn_{0.8}$ (101) (sample 3, upper curve). Individual peaks may also be observed for In and Sn as shown, and the Cu substrate. The three-digit numbers in parentheses correspond to the crystal planes from which X-ray diffraction is obtained.

The co-deposition of two electrode active species, in this case In and Sn, to form a binary anode active material is a novel way to combine the advantages of two individual active species into an improved anode including a binary In—Sn mixture, or compound. An improved electrode can be fabricated by the simultaneous deposition (such as co-sputtering) of two metallic species, here In and Sn, the metallic species combining within the electrode to form a binary intermetallic compound.

Figure 4:
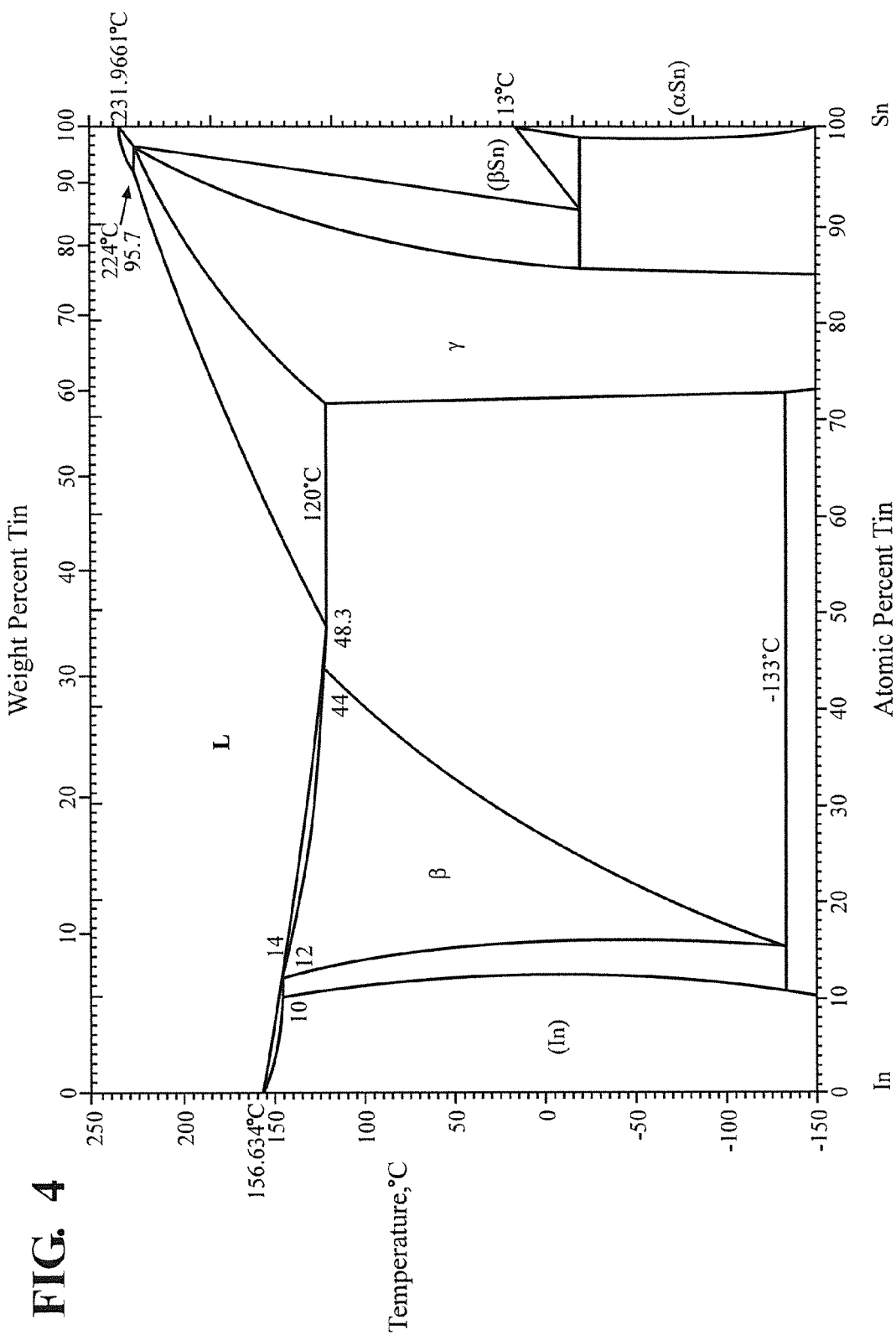
FIG. 4 shows the phase diagram of In—Sn, showing formation of various solid solutions between In and Sn at various deposition conditions.

FIG. 4 shows a phase diagram for In—Sn, showing the availability of a wide range of solid solutions between In and Sn for various deposition conditions. The figure shows that it is possible to obtain In—Sn compositional ranges across almost the entire range, i.e. for $In_{1-x}$ for x from almost 0 to almost 1. Even for deposition at room temperature, as in the present experimental examples, there are numerous phase boundaries and opportunities to form intermetallic phases of various compositions.

The data of FIGS. 2A-2C show different plateau regions, which are consistent with the presence of different intermetallic phases of In and Sn according to deposition conditions and hence the atomic ratio In:Sn in the deposited film. The data of FIG. 2A appear to correspond to formation of a film of $In_{0.2}Sn_{0.8}$. FIGS. 2A, 2B and 2C show different plateau regions, which apparently correspond to the presence of different intermetallic phases in the as-deposited films.

By varying the deposition conditions, including the deposition temperature and atomic ratio of In:Sn in the final film, different composition(s) and (if relevant) proportions of In—Sn intermetallic compounds may be formed in the anode active material.

In examples of the present invention, an intermetallic phase of In and Sn may be formed having the composition $In_{1-x}Sn_x$, where x may be in the range 0.05 and 0.95, such as 0.2 to 0.8, for example 0.4 to 0.6. In some examples x may be approximately 0.5, corresponding to an approximate one to one atomic percent composition of InSn.

Figure 5:
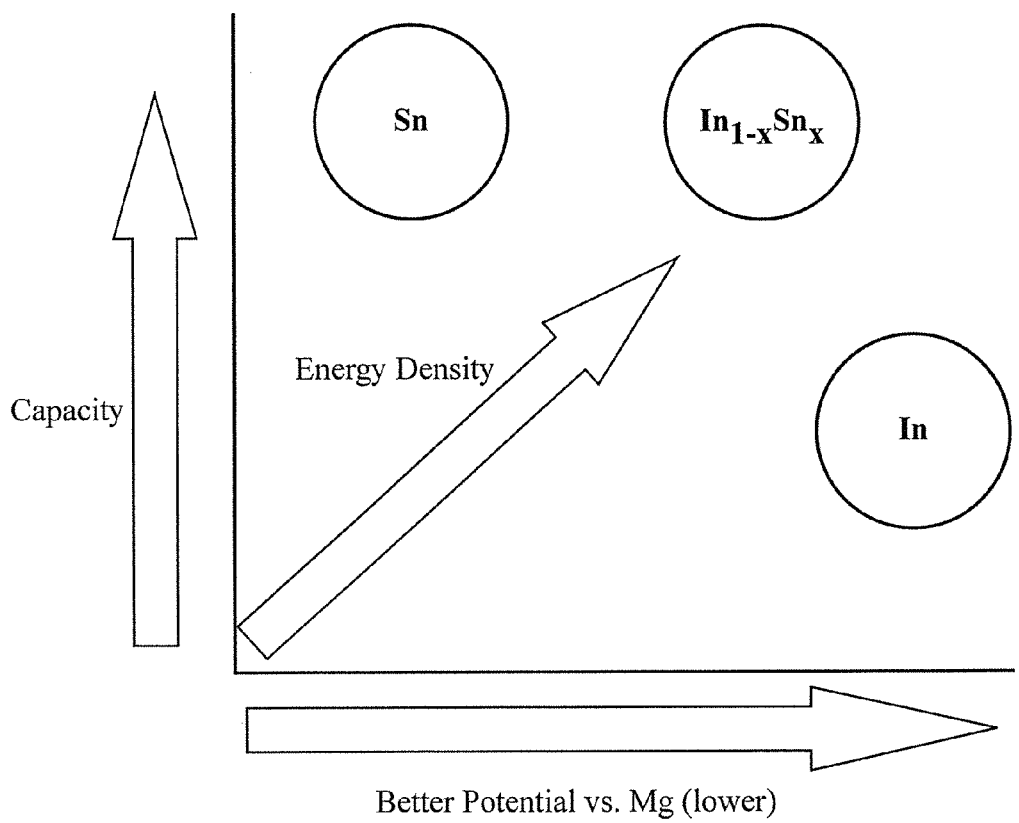
FIG. 5 is a simplified schematic illustrating how the composition of $In_{1-x}Sn_x$ may be varied to obtain different relative advantages in capacity or voltage, as required.

FIG. 5 is a schematic representation of the advantages of combining the lower $Mg^{2+}$ insertion/extraction voltage of In and high electrochemical capacity of Sn into a single anode active material. As illustrated, a Sn anode gives excellent capacity, and an In anode gives excellent insertion/extraction voltages. An anode composition including In and Sn, for example $In_{1-x}Sn_x$, allows a desired combination of capacity and insertion/extraction voltage to be achieved by varying the composition. The combination of high capacity and excellent insertion/extraction voltage of Sn and In, respectively, allows improvements in battery properties such as available energy density. As shown schematically in FIG. 5, the energy densities achievable using example anodes of the present invention may exceed those achievable using In or Sn alone. Further, these novel anode materials, when combined with the correct combination of cathode and electrolyte, provide advantages over conventional lithium-ion batteries.

Examples of the present invention include magnesium-ion batteries including a cathode, anode, and an electrolyte including magnesium ions, where the anode includes a solid solution binary alloy of In and Sn. In some examples, the In—Sn anode active material includes one or more intermetallic compounds of In and Sn. Charging and discharging of the battery may include the formation and restoration of fully magnesiated compounds of In and/or Sn. Examples of the present invention include batteries in which formation of fully magnesiated compounds of both In and Sn occurs within the electrode, during a charge-discharge cycle of the battery.

Direct reactions between $Mg^{2+}$ and Sn, for example to form $Mg_2Sn$, and between Mg2+ and In, for example to form $Mg_3In_2$, are well understood. For an In—Sn intermetallic phase, the insertion process of $Mg^{2+}$ ions depends on the composition and crystal form of the intermetallic phase.

In some examples, the improved anode active materials are deposited directly on the inner surface of a terminal. The terminal acts as both the anode support, and the external anode of the battery. Hence, further separate terminal and anode support layers are not necessary, providing an improvement in available energy density. The battery terminal may have an outer surface, providing the battery terminal, and an inner surface on which the anode active material is directly formed.

An improved In—Sn electrode active material can be formed by sputtering In and Sn together onto an anode support. In the example of magnetron sputtering, the control gun power may be adjusted for each source to obtain the desired intermetallic or other solid solution composition desired. In this way, batteries having different anode compositions may be fabricated by the same equipment, but having different combinations of desirable properties such as capacity and insertion/extraction voltage.

In some examples, the anode active layer may be formed by electrodeposition on the inner surface of a battery terminal, or otherwise formed on the anode support layer. Electrodeposition approaches include solution-based electrosynthesis techniques that may form the anode material directly on the surface of an anode support (or current collector, which may be the interior surface of the anode terminal). A solution including both indium and tin ions can be used for simultaneous co-electrodeposition of the respective metals, or alternating In/Sn layers may be deposited by any technique and later combined by a thermal or other process. Electrodeposition can also be used to fabricate anodes with high-surface area, three-dimensional structures, for example by forming an anode layer on a ridged surface of an anode support, or other anode support layer with three-dimensional topography, for example including pillars, depressions, grating structures, and the like. The available surface area of the anode support may be at least doubled by a three-dimensional surface topography. Active materials may be nanostructured, and in some cases may be wholly or partially encapsulated, for example by carbon nanotubes, hollow micro- or nanospheres, and the like.

Sputter deposition, electrodeposition and powder films may be used to form planar and high surface area intermetallic anodes, allowing insertion/extraction of $Mg^{2+}$. Sputter deposition, electrodeposition, standard powder films, and other approaches may be used to fabricate planar and high surface area In—Sn binary anodes, such as anodes including In—Sn intermetallic compounds. XRD, XRF, SEM, EDS and electrochemistry may be used to analyze the insertion/extraction of $Mg^{2+}$. The improved In—Sn active material anodes display high capacity, good cyclability, low insertion/extraction voltages for $Mg^{2+}$, and compatibility with high oxidation stability electrolytes.

An improved method of operating a magnesium-ion battery includes providing an anode including In and Sn, preferably an anode including a binary intermetallic compound of In and Sn, providing an electrolyte including a source of magnesium ions, providing a cathode, and then operating the battery such that magnesiated (in some cases, fully magnesiated) In and Sn compounds are formed during the cycling of the battery. Using a binary intermetallic anode, fully magnesiated compounds can be formed, improving the capacity and insertion/extraction voltage of the battery.

Examples of the present invention include batteries having one or more cells, electrically connected in parallel and/or series, in any appropriate form factor such as button cells, other round cells, cylindrical cells, rectangular or other prismatic cells, and the like. Example apparatus also include rolled-up battery forms, and combinations of a battery with a supercapacitor and/or fuel cell, and the like.

Examples of the present invention also include various electrically-powered apparatus, such as consumer electronic devices, medical devices, electric or hybrid vehicles, or other apparatus including batteries according to examples of the present invention.

Examples of the present invention include both primary and secondary batteries. Specific examples include rechargeable magnesium-ion batteries. Examples of the present invention include a magnesium-based battery, for example a rechargeable magnesium-ion battery, including an electrode active material including a binary compound and/or alloy of In and Sn.

Electrodes may be fabricated by any suitable method. In some examples, a paste may be formed of particles, such as microparticles or nanoparticles, of the active material, a binder, and an electron-conducting material (e.g. graphitic carbon particles or carbon black). The paste may be deposited on an electrically conducting substrate, such as an electrode support and current collector, and heat treated as necessary.

An improved process of fabricating a battery, such as a rechargeable magnesium-ion battery, includes providing first and second electrodes separated by an electrolyte, at least one electrode including a binary compound and/or alloy of indium and tin.

An improved method of operation of a magnesium battery includes formation of an intermetallic compound of indium and magnesium, and an intermetallic compound of tin and magnesium, for example $In_xSn_{1-x}$ during the charge-discharge cycle of a rechargeable Mg-ion battery. Example batteries according to the present invention may include any electrode (such as anode) configuration described herein.

Examples of the present invention also include rechargeable calcium-ion batteries, in which the magnesium ions of the described rechargeable Mg-ion battery examples are substituted by calcium ions. Examples of the present invention also include rechargeable aluminum-ion batteries, in which the magnesium ions of the described rechargeable Mg-ion battery examples are substituted by aluminum ions.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. An apparatus, the apparatus being a rechargeable battery comprising:
   a first electrode, including an active material;
   a second electrode;
   an electrolyte located between the first electrode and the second electrode, the electrolyte including magnesium ions,
   the active material including a binary combination of indium and tin,
   the active material allowing insertion and extraction of the magnesium ions during operation of the rechargeable battery, insertion of the magnesium ions into the active material including formation of a magnesiated indium compound and a magnesiated tin compound,
   the apparatus being a rechargeable magnesium-ion battery,
   the first electrode being an anode.

2. The apparatus of claim 1, the active material including an intermetallic compound of indium and tin.

3. The apparatus of claim 2, the intermetallic compound of indium and tin having a composition $In_{1-x}Sn_x$, where $0.01 \leq x \leq 0.99$.

4. The apparatus of claim 3, where $0.2 \leq x \leq 0.8$.

5. The apparatus of claim 2, the intermetallic compound of indium and tin being $In_{0.2}Sn_{0.8}$.

6. The apparatus of claim 1, the binary combination of indium and tin including a plurality of intermetallic compounds of indium and tin.

7. The apparatus of claim 1, the binary combination of indium and tin being a binary solid solution of indium and tin.

8. The apparatus of claim 1, the magnesiated indium compound being a fully magnesiated indium compound, the magnesiated tin compound being a fully magnesiated tin compound.

9. The apparatus of claim 1, the apparatus having a first electrical terminal electrically connected to the first electrode, and a second electrical terminal electrically connected to the second electrode,
   the first electrical terminal having an exterior surface and an interior surface,
   the active material being deposited directly on the interior surface of the first electrical terminal.

10. The apparatus of claim 1, the electrolyte including a non-aqueous ionic solution of the magnesium salt.

11. The apparatus of claim 8, the magnesium salt being a compound of magnesium and a counter-ion, the counter-ion being selected from a group consisting of trifluoromethane-sulfonimide ($TSFI^-$), perchlorate ($ClO_4^-$), and hexafluorophosphate ($PF_6^-$).

12. An apparatus, the apparatus being a rechargeable magnesium-ion battery comprising:
   an anode, including an anode active material;
   an anode support;
   an anode terminal, providing an external negative electrical terminal for the battery, the anode terminal being electrically connected to the anode support;
   a cathode, including a cathode active material;
   a cathode support;
   a cathode terminal, providing an external positive electrical terminal for the battery, the anode terminal being electrically connected to the anode support;
   an electrolyte located between the anode and the cathode, the electrolyte including magnesium ions,
   the anode active material including indium and tin,
   wherein the anode active material interacts with the magnesium ions to form a fully magnesiated compound of indium and a fully magnesiated compound of tin during a charge-discharge cycle of the rechargeable magnesium-ion battery.

13. The apparatus of claim 12, the anode active material including an intermetallic compound of indium and tin.

14. The apparatus of claim 12, the anode active material including a binary solid solution of indium and tin.

15. The apparatus of claim 12, the anode terminal having an exterior surface and an interior surface, the anode active material being formed directly on the interior surface of the anode terminal.

16. The apparatus of claim 12, where the cathode active material includes a magnesium ion intercalating compound.

* * * * *